(12) United States Patent
Neubauer

(10) Patent No.: US 9,183,468 B2
(45) Date of Patent: Nov. 10, 2015

(54) DEVICE FOR READING MAGNETIC STRIPE AND/OR SMART CARDS AND METHOD FOR PREVENTING SKIMMING ATTACKS

(71) Applicant: Wincor Nixdorf International GmbH, Paderborn (DE)

(72) Inventor: Lutz Neubauer, Bad Wuennenberg-Leiberg (DE)

(73) Assignee: Wincor Nixdorf International GmbH (DE)

( * ) Notice: Subject to any disclaimer, the term of this patent is extended or adjusted under 35 U.S.C. 154(b) by 0 days.

(21) Appl. No.: 14/257,421

(22) Filed: Apr. 21, 2014

(65) Prior Publication Data

US 2014/0312117 A1    Oct. 23, 2014

(30) Foreign Application Priority Data

Apr. 23, 2013 (EP) .................................. 13164927

(51) Int. Cl.
*G06K 7/00* (2006.01)
*G06K 7/08* (2006.01)
*G06K 13/08* (2006.01)
*G07F 19/00* (2006.01)

(52) U.S. Cl.
CPC .............. *G06K 13/08* (2013.01); *G06K 7/0004* (2013.01); *G06K 7/084* (2013.01); *G07F 19/2055* (2013.01)

(58) Field of Classification Search
CPC ......... G06K 7/00; G06K 7/082; G06K 13/00; G06K 13/07; G11B 19/00
USPC .......................... 235/375, 379, 435, 449, 451
See application file for complete search history.

(56) References Cited

U.S. PATENT DOCUMENTS

| | | | |
|---|---|---|---|
| 4,613,747 A * | 9/1986 | McCarthy | ...................... 235/480 |
| 5,397,886 A | 3/1995 | Mos et al. | |
| 5,929,413 A | 7/1999 | Gardner | |
| 8,459,549 B2 | 6/2013 | Schliebe et al. | |
| 8,579,190 B2 | 11/2013 | Golueke et al. | |
| 8,690,052 B1 * | 4/2014 | Lewis et al. | ................... 235/379 |

FOREIGN PATENT DOCUMENTS

| | | |
|---|---|---|
| DE | 102006049204 B3 | 1/2008 |
| FR | 2843818 A1 | 2/2004 |

\* cited by examiner

*Primary Examiner* — Laura Gudorf
(74) *Attorney, Agent, or Firm* — Harness, Dickey & Pierce, P.L.C.

(57) ABSTRACT

A device (10) for reading a magnetic stripe card and/or smart card (22) comprising a slot (12) for feeding the magnetic stripe card and/or smart card (22). A rotary unit (18) for rotating a fed magnetic stripe card and/or smart card (22) from the feeding plane (24) into a reading plane (32) extending at a predetermined angle (W1) relative to the feeding plane (24) is arranged behind the slot (12) as viewed in feed direction (P1). Further, the invention relates to a method for preventing skimming attacks.

8 Claims, 3 Drawing Sheets

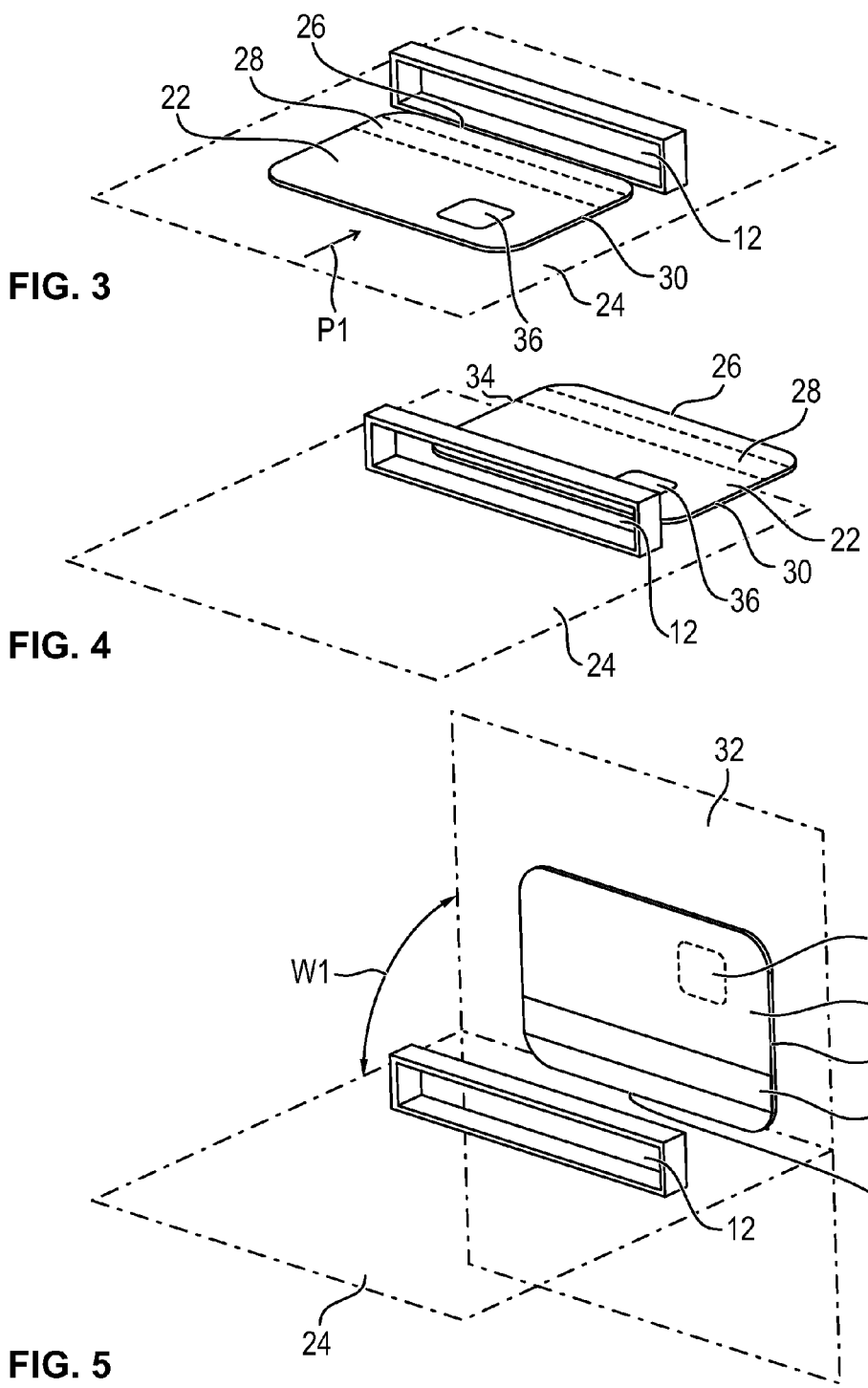

DEVICE FOR READING MAGNETIC STRIPE AND/OR SMART CARDS AND METHOD FOR PREVENTING SKIMMING ATTACKS

CROSS-REFERENCE TO RELATED APPLICATIONS

This application claims priority to European patent application EP-13 164 927.9 filed Apr. 23, 2013 which is hereby incorporated by reference.

BACKGROUND OF THE INVENTION

1. Technical Field

The invention relates to a device for reading magnetic stripe cards and/or smart cards, in particular EC (electronic cash) cards and credit cards, which comprises a slot for feeding magnetic stripe card and/or smart cards in a feed direction, a fed magnetic stripe card and/or smart card being arranged in a feeding plane during feeding. Further, the invention relates to a method for preventing skimming attacks, in which a magnetic stripe card and/or smart card is fed to a device for reading magnetic stripe cards and/or smart cards, the magnetic stripe card and/or smart card being arranged in a feeding plane during feeding.

2. Discussion

In automated teller machines, POS systems, payment terminals and other devices in which magnetic stripe cards and/or smart cards, for example EC cards, credit cards or bank cards, are inserted for payment or withdrawal of cash, there is the problem that people attempt, with intent to defraud, to unauthorizedly read out the data stored on the cards and to spy out data associated with the card to thus be able to withdraw cash by means of these data in an unauthorized manner. Such attempts to spy out the data are referred to as skimming attacks.

Numerous methods are known by which one attempts to detect skimming modules that are arranged outside in front of the feeding slot for the magnetic stripe card and/or smart card. For example, the corresponding areas are monitored by means of cameras, and changes in the structure are detected.

To prevent this, recently more and more very small miniature skimming modules are inserted into the same slot into which the magnetic stripe card and/or smart card is inserted. These modules are designed such that they can read out the data of the cards, while these cards are accepted normally within the device for reading magnetic stripe card and/or smart cards.

From the document DE 10 2006 049 204 B2, it is known to insert EC cards into an automated teller machine with their longer longitudinal side first and thus transversely to the reading direction of the magnetic stripe card. In this way, it shall be prevented that skimming modules mounted on the outside of the automated teller machine can read out data when the card is drawn in. The direction of movement of the card is then changed in the automated teller machine so that now it is transported with its short side first and the magnetic stripe card can be read out during this transport via a stationary reading head.

SUMMARY OF THE INVENTION

It is an object of the invention to specify a device for reading magnetic stripe cards and/or smart cards as well as a method for preventing skimming attacks, by means of which skimming attacks carried out by miniature skimming modules inserted into the slot can be prevented reliably in an easy manner.

According to an aspect of the invention, a rotary unit for rotating an inserted magnetic stripe card and/or smart card from the feeding plane into a reading plane is provided behind the slot as viewed in the feed direction, the reading plane extending at a predetermined angle relative to the feeding plane. By means of this rotation of the magnetic stripe card and/or smart card after its feeding into a reading plane that is different from the feeding plane it is achieved that inserted miniature skimming modules which are inevitably arranged in the feeding plane cannot read out the smart card that is no longer arranged in the feeding plane. Thus, such skimming attacks are prevented reliably and securely.

In the preferred embodiment of the present application, this rotation is generally defined such that the orientation of the magnetic stripe card and/or smart card is changed in such a way that the plane defined by the magnetic stripe card and/or smart card changes. In particular, this rotation is not defined such that the orientation of the magnetic stripe card and/or smart card is changed only within a plane.

Preferably, the feeding plane and the reading plane are not identical and not parallel to each other either.

By the magnetic stripe card and/or smart card being arranged in a specific plane, it is in particular understood that it lies with its face, i.e. its front or rear side, within this plane.

The predetermined angle in particular has a value between 30° and 120°, preferably between 80° and 100°. It is particularly advantageous when the reading plane is orthogonal to the feeding plane, i.e. when the predetermined angle has a value of 90°. This means that the magnetic stripe card and/or smart card is rotated by 90° by means of the rotary unit.

The feeding plane in particular extends horizontally. In the preferred embodiment in which the reading plane is orthogonal to the feeding plane, the reading plane thus extends vertically.

The magnetic stripe card and/or smart card is in particular an EC card, a credit card or a bank card. The device for reading a magnetic stripe card and/or smart card is in particular an automated teller machine (ATM), an automatic point of sale (POS) system, an automated teller safe, a payment terminal or a reading unit that can be integrated in machines.

In a preferred embodiment, the rotary unit comprises transport elements for transporting the magnetic stripe card and/or smart card along a transport path, the transport path being formed such that the magnetic stripe card and/or smart card is rotated from the feeding plane into the reading plane during transport along the transport path. The transport path in particular has an arc-shaped section by which the rotation of the magnetic stripe card and/or smart card is caused. This arc-shaped section can in particular be shaped like a circular arc segment. Given a rotation by 90°, this circular arc segment-shaped section in particular corresponds to a quarter circle-shaped section. In this way, the magnetic stripe card and/or smart card can reliably be rotated in an easy manner.

In an alternative embodiment of the invention, the rotary unit can also be designed such that the magnetic stripe card and/or smart card is rotatably by means of the rotary unit from the feeding plane into the reading plane about a longitudinal axis of the magnetic stripe card and/or smart card, this longitudinal axis preferably being stationary during rotation. For this, the rotary unit in particular comprises at least one gripping element for gripping an inserted magnetic stripe card and/or smart card, this gripping element being adjustable by means of a drive unit preferably such that the gripped magnetic stripe card and/or smart card can be rotated by the predetermined angle. Thus, a particularly simple space-saving rotary unit is realized.

In particular, two gripping elements are provided which grip the magnetic stripe card and/or smart card on opposite sides. The two gripping elements can preferably be rotated synchronously so that the magnetic stripe card and/or smart card is rotated accordingly, without torsion forces acting thereon and any damages occurring.

In case that the magnetic stripe card and/or smart card is fed with its longitudinal side first, the gripping elements are in particular arranged such that they grip the magnetic stripe card and/or smart card at its two short sides. In particular each of the gripping elements grips the magnetic stripe card and/or smart card such that they neither contact the magnetic stripe card nor the chip in the smart card. Thus, it is guaranteed that the magnetic stripe card or the chip can be read out while the magnetic stripe card and/or smart card is still held by the gripping elements. Alternatively, when the magnetic stripe card and/or smart card is fed with one of its longitudinal sides first, the gripping elements can also be arranged at the two longitudinal sides.

It is particularly advantageous when the rotary unit rotates the magnetic stripe card and/or smart card about that one of its longitudinal axes that extends orthogonally to the feed direction. In this way, a particularly simple design of the device can be achieved. Alternatively, the rotary unit can also rotate the magnetic stripe card and/or smart card about one of its longitudinal axes that extends in the feed direction.

The rotary unit is in particular arranged directly behind the slot, as a result whereof it is guaranteed that the orientation of the card is immediately changed before a skimming module that might have been inserted can access the data. In particular, in this way also the space for skimming modules that might be inserted is minimized.

The slot is preferably dimensioned such that the magnetic stripe card and/or smart card is insertable into the slot for feeding into the device with one of its longitudinal sides first. This has the advantage that the magnetic stripe card and/or smart card is fed transversely to the reading direction of the magnetic stripe card so that a skimming module mounted in front of the slot cannot read out these data during feeding of the magnetic stripe card and/or smart card.

The device in particular has a reading unit for reading out data stored on the magnetic stripe card of the magnetic stripe card and/or smart card and/or for reading out data stored on the chip of the magnetic stripe card and/or smart card. The reading unit is in particular designed such that the magnetic stripe card and/or smart card can be read only when it is arranged in the reading plane.

In a particularly preferred embodiment, the reading unit comprises a reading head for reading the data stored on the magnetic stripe card, which reading head is movable along the magnetic stripe card of a magnetic stripe card and/or smart card arranged in the reading plane at a reading position. Thus, the magnetic stripe card can be read out without the magnetic stripe card and/or smart card having to be moved for this. This is particularly advantageous since after the rotation of the magnetic stripe card and/or smart card thus no transport within the reading plane is required.

A further aspect of the invention relates to a method for preventing skimming attacks, in which the magnetic stripe card and/or smart card is rotated after feeding so that it is arranged in a reading plane that extends at a predetermined angle relative to the feeding plane in which the magnetic stripe card was arranged during feeding. The reading out of data stored on the magnetic stripe card or the chip by means of skimming modules inserted into the slot is prevented by this method.

BRIEF DESCRIPTION OF THE DRAWINGS

Further features and advantages of the invention result from the following description which explains the invention in more detail on the basis of embodiments.

FIG. 3 shows a schematic illustration of the feeding of a magnetic stripe card and/or smart card in a first operating state.

FIG. 4 shows a schematic illustration of the feeding of the magnetic stripe card and/or smart card in a second operating state.

FIG. 5 shows a schematic illustration of the feeding of the magnetic stripe card and/or smart card in a third operating state.

DETAILED DESCRIPTION OF THE PREFERRED EMBODIMENTS

Figure 1:
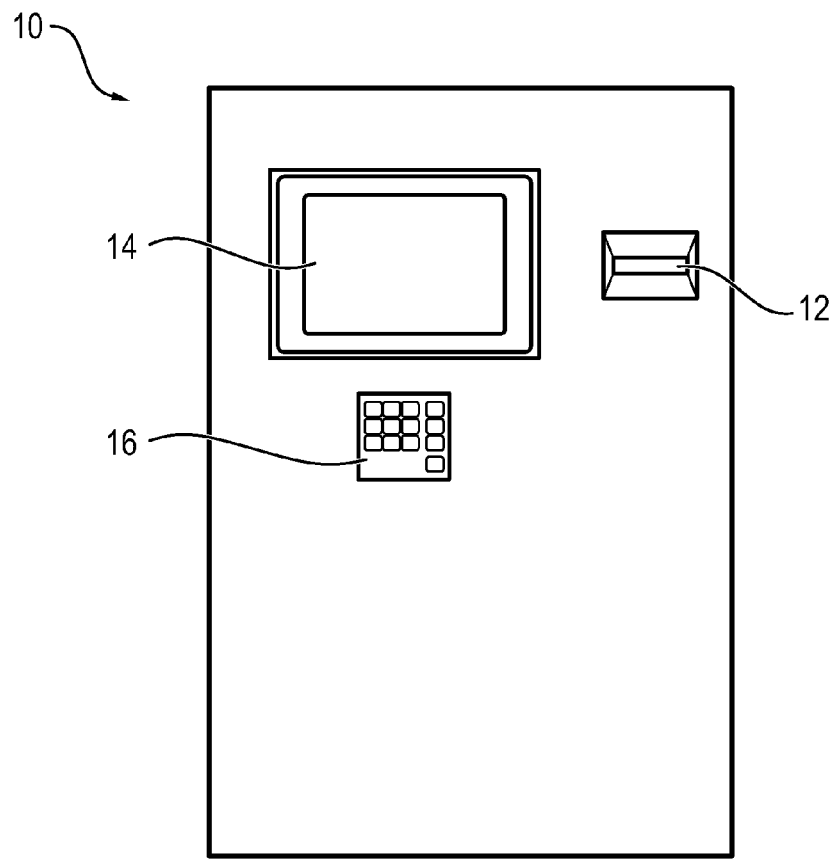
FIG. 1 shows a schematic illustration of an automated teller machine.

In FIG. 1, a schematic illustration of a device 10 for reading a magnetic stripe card and/or smart card is illustrated. The device 10 according to FIG. 1 is designed in the form of an automated teller machine. Alternatively, the device 10 can also be an automatic POS system, an automated teller safe, a mobile payment terminal, a stationary payment terminal or any other device for reading magnetic stripe card and/or smart cards which can be installed in other devices. The magnetic stripe card and/or smart card is in particular a bank card, an EC card and/or a credit card.

The automated teller machine 10 comprises a slot 12 for inserting magnetic stripe cards and/or smart cards. Further, the automated teller machine 10 has a display 14 for displaying information to a user and a keyboard 16 which serves, inter alia, for the input of the PIN that is assigned to an inserted magnetic stripe card and/or smart card to thus authenticate the user. In an alternative embodiment of the invention a keyboard 16 can also be dispensed with when the display 14 is designed as a touchscreen so that the input of the PIN and of further information can be done via this touchscreen 14.

In the case of unauthorized skimming attacks, the people carrying out the skimming attack often insert a miniature skimming module into the slot 12, which skimming module is designed such that it can read out the data of a magnetic stripe card and/or smart card inserted normally into the slot. Further, by the people carrying out the skimming attack the PIN is spied out, which may take place for example by means of a camera mounted in a hidden manner or a further keyboard mounted on the actual keyboard 16. If the person carrying out the skimming attack thus knows both the data of the magnetic stripe card and/or smart card and the PIN, this person can draw money from the account associated with the magnetic stripe card and/or smart card in an unauthorized manner.

Figure 2:
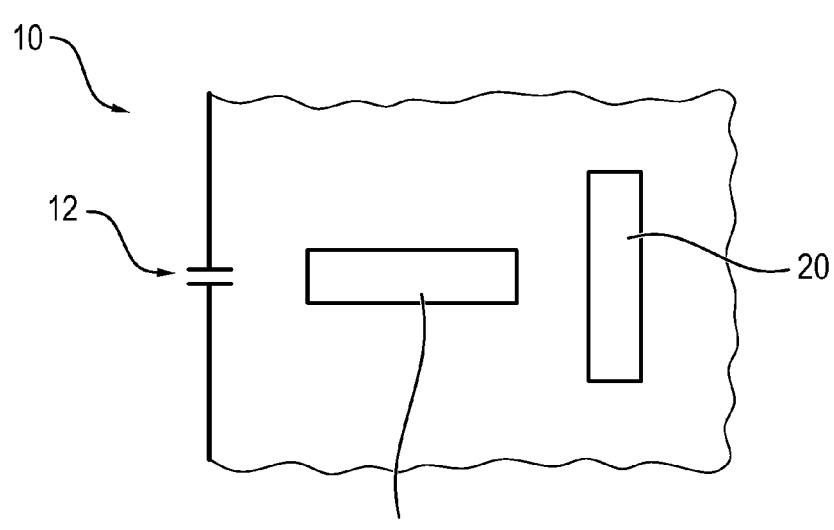
FIG. 2 shows a schematic illustration of a section of the automated teller machine according to FIG. 1.

In order to prevent such skimming attacks with inserted skimming modules, the structure schematically illustrated in FIG. 2 is used, the functioning of which is schematically explained in connection with FIGS. 3 to 5.

According to the teachings of this invention, a rotary unit 18 for rotating a magnetic stripe card and/or smart card is provided behind the slot 12. The magnetic stripe card and/or smart card 22 is fed in a feeding plane 24 in a feed direction P1, as schematically illustrated in FIG. 3. Here, the feeding plane 24 is the plane in which the major surface of magnetic stripe card and/or smart card 22 lies during feeding via the slot 12. In the illustrated embodiment illustrated, this feeding plane extends horizontally.

In a preferred embodiment, as illustrated in FIG. 3, the magnetic stripe card and/or smart card 22 is fed with one of its longer longitudinal sides 26 first, which has the advantage that it is fed transversely to the reading direction of the magnetic stripe card 28, and thus the magnetic stripe card 28 cannot be read out during feeding of the magnetic stripe card and/or smart card 22 by means of a skimming module that might be mounted in front of the slot 12. In an alternative embodiment of the invention, the feeding of the magnetic stripe card and/or smart card 22 can also be effected with one of its shorter sides 30 first.

In FIG. 4, a second operating state is illustrated in which the magnetic stripe card and/or smart card 22 has been inserted into the device 10 so far that it is completely located behind the slot 12. In this second operating state, the magnetic stripe card and/or smart card 22 is still within the feeding plane 24. As shown in FIG. 5, by means of the rotary unit 18, the magnetic stripe card and/or smart card 22 is rotated by 90° directly after feeding through slot 12 so that now it is arranged in a reading plane 32 which extends perpendicular to the feeding plane 24. In an alternative embodiment of the invention, the magnetic stripe card and/or smart card 22 can also be rotated by an angle different from 90°, in particular by an angle between 45° and 135°.

Figure 7:
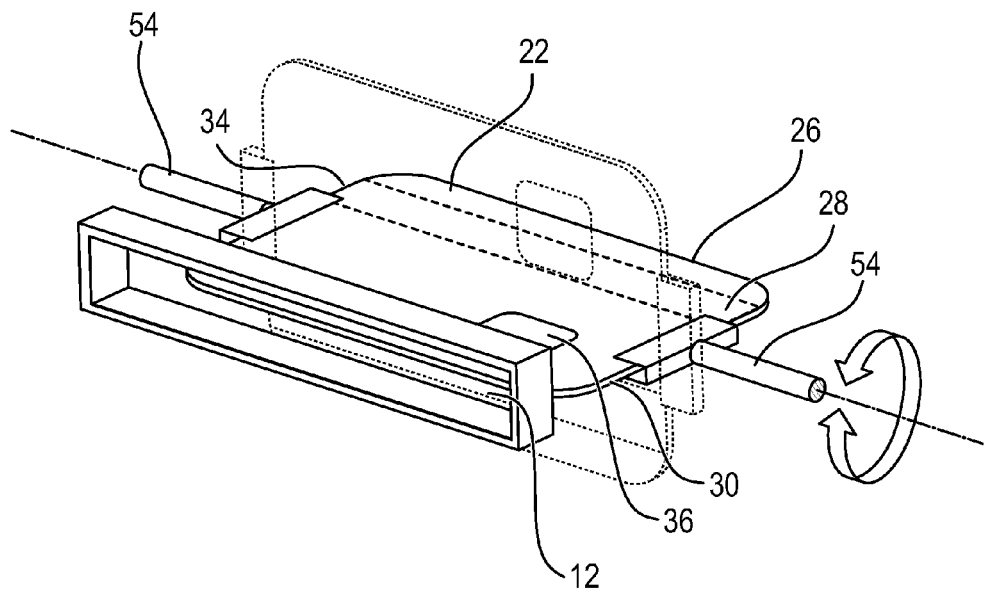
FIG. 7 shows a schematic illustration of a rotary unit for the card, in accordance with another embodiment of the invention.

Referring also to FIG. 7, the rotary unit 18 comprises in particular two gripping elements 54 which grip the magnetic stripe card and/or smart card 22 at the short sides 30, 34 of the magnetic stripe card and/or smart card. Here, the gripping elements 54 grip the magnetic stripe card and/or smart card 22 in particular in areas in which neither the magnetic stripe card 28 nor the chip 36 is arranged. The gripping elements 54 are in particular rotatable by means of a drive unit (represented by the arrows) so that via a synchronous rotation of the two gripping elements 54 the magnetic stripe card and/or smart card 22 gripped by them can be rotated accordingly.

Figure 6:
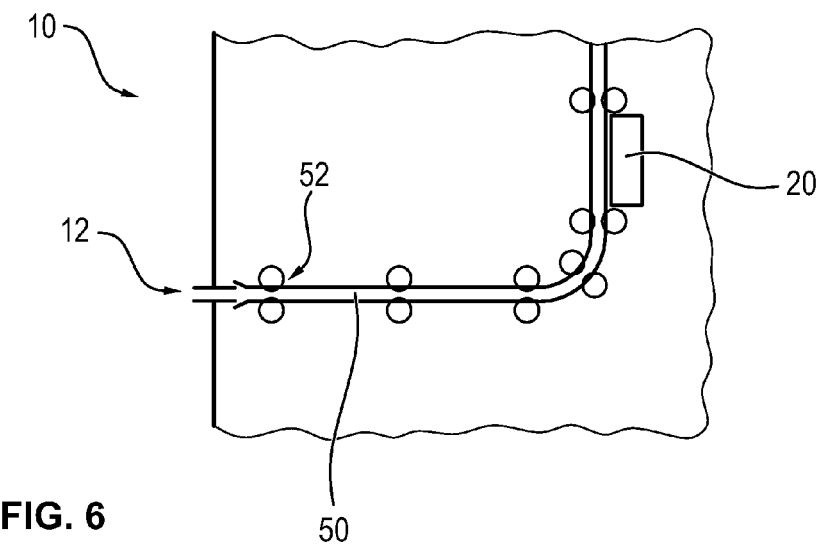
FIG. 6 shows a schematic illustration of a transport path for the card, in accordance with one embodiment of the invention.

In an alternative embodiment of the invention as shown in FIG. 6, the magnetic stripe card and/or smart card 22 can also be rotated by means of a transport unit. The transport unit has a plurality of transport elements 52 defining an arc-shaped transport path 50 by which the rotation of the magnetic stripe card and/or smart card 22 takes place during transport along this transport path 50.

Further, also any other possibility for rotating the magnetic stripe card and/or smart card 22 is possible. It is only essential that the magnetic stripe card and/or smart card 22 is rotated by the predetermined angle as immediately as possible after its input.

After the magnetic stripe card and/or smart card 22 had been rotated by the predetermined angle and is thus, as shown in FIG. 5, arranged in the reading plane 32, the magnetic stripe card and/or smart card 22 can be read out via a reading unit 20 (FIG. 2). This reading unit 20 in particular comprises a contact element which contacts the chip 36 of card 22 when it is arranged in a reading position in the reading plane 32. Alternatively or in addition to the contact element, the reading unit 20 can comprise a movable magnetic head which, when moved along the magnetic stripe 28 on card 22, can read out information stored on the magnetic stripe 28. Note, that the card 22 illustrated in the drawings contains both the magnetic stripe 22 and the chip 36 but this might not always be the case.

By rotating the magnetic stripe card and/or smart card it is achieved that a skimming module which might be inserted via the slot 12 cannot rest on the magnetic stripe card and/or smart card 22 and thus cannot remain in contact with the chip 36 of the magnetic stripe card and/or smart card 22. Thus, the magnetic stripe card and/or smart card 22 can be read out only by the reading unit 20 and the reading out of the data by unauthorized people can be prevented reliably.

What is claimed is:

1. A device for reading magnetic stripe cards and/or smart cards, said device comprising:
    a slot for feeding a magnetic stripe card and/or smart card in a feed direction, the magnetic stripe card and/or smart card being arranged in a feeding plane during feeding,
    a rotary unit for rotating a fed magnetic stripe card and/or smart card from the feeding plane into a reading plane extending at a predetermined angle relative to the feeding plane, the rotary unit being arranged behind the slot as viewed in the feed direction, the rotary unit being adapted to grasp the magnetic stripe card and/or smart card and rotate the magnetic stripe card and/or smart card about the magnetic stripe card and/or smart card's longitudinal axis while the axis remains stationary;
    a reading unit, spaced from the rotary unit and not rotating with the magnetic stripe card and/or smart card, for reading out data stored on the magnetic stripe card and/or smart card and/or for reading out data stored on a chip of the magnetic stripe card and/or smart card; and
    wherein the reading unit comprises a reading head for reading data stored on a magnetic stripe on the card, said reading head being movable along the magnetic stripe when the card is arranged in the reading plane at a reading position.

2. The device according to claim 1, wherein the predetermined angle has a value between 30° and 120°.

3. The device according to claim 1, wherein the reading plane is orthogonal to the feeding plane.

4. The device according to claim 1, wherein the rotary unit comprises at least one gripping element for gripping an inserted magnetic stripe card and/or smart card, and that the gripping element or the gripping elements are adjustable by means of a drive unit such that the gripped magnetic stripe card and/or smart card is rotatable by the predetermined angle.

5. The device according to claim 1 wherein the rotary unit rotates the magnetic stripe card and/or smart card about an axis defined by a longer edge of the card that runs orthogonal to the feed direction.

6. The device according to claim 1 wherein the rotary unit rotates the magnetic stripe card and/or smart card about an axis defined by a longer edge of the card that extends in feed direction.

7. The device according to claim 1 wherein the slot is dimensioned such that a longer edge of the magnetic stripe card and/or smart card is insertable into the slot for feeding into the device.

8. The device according to claim 1, wherein the reading unit is designed such that the magnetic stripe card and/or smart card is read only when the magnetic stripe card and/or smart card is arranged in the reading plane.

* * * * *